United States Patent
Zhou et al.

(10) Patent No.: US 7,973,760 B2
(45) Date of Patent: Jul. 5, 2011

(54) BACKLIGHT CONTROL CIRCUIT WITH INPUT CIRCUIT INCLUDING DIODE AND CAPACITOR

(75) Inventors: He-Kang Zhou, Shenzhen (CN); Jian-Hui Lu, Shenzhen (CN); Tong Zhou, Shenzhen (CN)

(73) Assignees: Innocom Technology (Shenzhen) Co., Ltd., Shenzhen, Guangdong Province (CN); Chemei Innolux Corporation, Miao-Li County (TW)

( * ) Notice: Subject to any disclaimer, the term of this patent is extended or adjusted under 35 U.S.C. 154(b) by 931 days.

(21) Appl. No.: 11/974,803

(22) Filed: Oct. 16, 2007

(65) Prior Publication Data
US 2008/0088257 A1 Apr. 17, 2008

(30) Foreign Application Priority Data
Oct. 16, 2006 (TW) .............................. 95138083 A

(51) Int. Cl.
*G09G 3/36* (2006.01)
(52) U.S. Cl. ....................................... 345/102; 315/291
(58) Field of Classification Search .................. 345/102; 349/618; 361/91.1; 315/291
See application file for complete search history.

(56) References Cited

U.S. PATENT DOCUMENTS
6,657,838 B2 12/2003 Min
7,030,569 B2 4/2006 Gray

FOREIGN PATENT DOCUMENTS
TW 200407631 A 5/2004
TW 200515840 A 5/2005

*Primary Examiner* — Alexander Eisen
*Assistant Examiner* — Robin Mishler
(74) *Attorney, Agent, or Firm* — Wei Te Chung

(57) ABSTRACT

An exemplary backlight control circuit (200) includes a DC power supply (VDD), a load circuit (210), an input circuit (230), and a PWM IC (250). The load circuit includes two light sources (2113, 2114) and a rectifier and filter circuit (213). The input circuit includes a diode (231) and a capacitor (237). The PWM IC includes a current sampling pin (251) and an overvoltage protection pin (253). A low voltage terminal of a first one of the two light sources is connected to the current sampling pin via the rectifier and filter circuit, and a low voltage terminal of a second one of the two light sources is connected to a cathode of the diode. An anode of the diode is connected to the DC power supply and grounded via the capacitor. The overvoltage protection pin is connected to the DC power supply.

20 Claims, 3 Drawing Sheets

BACKLIGHT CONTROL CIRCUIT WITH INPUT CIRCUIT INCLUDING DIODE AND CAPACITOR

FIELD OF THE INVENTION

The present invention relates to control circuits and, particularly, to a backlight control circuit with an input circuit including a diode and a capacitor. The backlight control circuit can, for example, be used in a liquid crystal display (LCD).

GENERAL BACKGROUND

A typical LCD has the advantages of portability, low power consumption, and low radiation. LCDs have been widely used in various portable information products, such as notebooks, personal digital assistants (PDAs), video cameras, and the like. Furthermore, LCDs are considered by many to have the potential to completely replace CRT (cathode ray tube) monitors and televisions.

A typical LCD includes an LCD panel, a backlight for illuminating the LCD panel, an inverter circuit for driving the backlight, and a backlight control circuit. The backlight control circuit generally includes a pulse width modulation integrated circuit (PWM IC) for driving the inverter circuit, and a backlight protection circuit for shutting down the PWM IC when any lamp of the backlight has an open circuit or a short circuit.

FIG. 3 is an abbreviated diagram of a typical backlight control circuit used in an LCD. The backlight control circuit 100 includes four load circuits 110, a PWM IC 150, and a backlight protection circuit (not labeled). The backlight protection circuit includes a first transistor 1331, a current limiting resistor 172, and an input circuit 130.

Each load circuit 110 includes a lamp 111 and a lamp inspecting circuit 113 connected in series between a power supply (not shown) and ground. The lamp inspecting circuit 113 includes an output terminal 112. The output terminal 112 provides a high voltage when the corresponding lamp 111 works, and provides a low voltage when the corresponding lamp 111 has an open circuit or a short circuit.

The PWM IC 150 includes a current sampling pin 151. The PWM IC 150 stops working if the current sampling pin 151 has a low voltage.

The first transistor 1331 includes a source electrode "S", a drain electrode "D", and a gate electrode "G". The source electrode "S" is grounded. The drain electrode "D" is connected to the current sampling pin 151 of the PWM IC 150. The gate electrode "G" is connected to a power supply via the current limiting resistor 172.

The input circuit 130 includes four diodes 131, four resistors 132, four capacitors 135, a second transistor 1332, a third transistor 1333, a fourth transistor 1334, and a fifth transistor 1335. Each transistor 1332, 1333, 1334, and 1335 includes a source electrode "S", a drain electrode "D", and a gate electrode "G". The drain electrode "D" of the second transistor 1332 is connected to the gate electrode "G" of the first transistor 1331. The drain electrode "D" of the third transistor 1333 is connected to the source electrode "S" of the second transistor 1332. The drain electrode "D" of the fourth transistor 1334 is connected to the source electrode "S" of the third transistor 1333. The drain electrode "D" of the fifth transistor 1335 is connected to the source electrode "S" of the fourth transistor 1334. The source electrode "S" of the fifth transistor 1335 is grounded. The gate electrodes "G" of the second, third, fourth, and fifth transistors 1332, 1333, 1334, and 1335 are connected to the cathodes of the four diodes 131, respectively. Anodes of the four diodes 131 are, respectively, connected to a corresponding output terminal 112 of the lamp inspecting circuits 113. Each of the gate electrodes "G" of the second, third, fourth, and fifth transistors 1332, 1333, 1334, and 1335 is grounded via a corresponding resistor 132 and via a corresponding capacitor 135, respectively.

The first transistor 1331, the second transistor 1332, the third transistor 1333, the fourth transistor 1334, and the fifth transistor 1335 are all negative-channel metal oxide semiconductor (NMOS) type transistors.

Operation of the backlight control circuit 100 is as follows. When all the lamps 111 work normally, each of the output terminals 112 provides a high voltage to the gate electrode "G" of the corresponding second, third, fourth, and fifth transistors 1332, 1333, 1334, and 1335 via the corresponding diode 131. Then the second, third, fourth, and fifth transistors 1332, 1333, 1334, and 1335 are switched to an activated state, and the gate electrode "G" of the first transistor 1331 is grounded via the activated second, third, fourth, and fifth transistors 1332, 1333, 1334, and 1335. Thus, the first transistor 1331 is turned off, and the current sampling pin 151 of the PWM IC 150 maintains an original working voltage.

When any one of the lamps 111 has an open circuit or a short circuit, the corresponding output terminal 112 provides a low voltage to the gate electrode "G" of the corresponding second, third, fourth, or fifth transistor 1332, 1333, 1334, or 1335 via the corresponding diode 131. Then the corresponding second, third, fourth, or fifth transistor 1332, 1333, 1334, or 1335 is turned off, so that the gate electrode "G" of the first transistor 1331 is charged to a high voltage by the power supply via the current limiting resistor 172. Thus, the first transistor 1331 is switched to an activated state, and the current sampling pin 151 of the PWM IC 150 is grounded via the activated first transistor 1331. Consequently, the current sampling pin 151 of the PWM IC 150 is charged to a low voltage, and the PWM IC 150 stops working.

The backlight control circuit 100 includes five transistors 1331, 1332, 1333, 1334, and 1335 to carry out the function of protecting the lamps 111. Furthermore, the number of the transistors needed increases along with the number of lamps 111 used in the LCD. Consequently, the cost of the backlight control circuit 100 is high, particularly in the case where the number of lamps 111 is large.

It is desired to provide a backlight control circuit used typically in an LCD which overcomes the above-described deficiencies.

SUMMARY

In one preferred embodiment, a backlight control circuit includes a direct current (DC) power supply, a pulse width modulation integrated circuit (PWM IC), a load circuit, and an input circuit. The PWM IC includes a current sampling pin and an overvoltage protection pin. The overvoltage protection pin of PWM IC is connected to the DC power supply. The PWM IC configures to stop working if one of the current sampling pin and the overvoltage protection pin has a low voltage. The input circuit includes a diode and a capacitor. An anode of the diode of the input circuit is connected to the DC power supply and grounded via the capacitor. The load circuit includes two light sources, and a rectifier and filter circuit. A low voltage terminal of a first one of the two light sources is connected to the current sampling pin of the PWM IC via the rectifier and filter circuit, a low voltage terminal of a second one of the two light sources is connected to a cathode of the diode of the input circuit.

Other novel features and advantages of the above-described backlight control circuit will become more apparent from the following detailed description when taken in conjunction with the accompanying drawings.

DETAILED DESCRIPTION OF PREFERRED EMBODIMENTS

Reference will now be made to the drawings to describe various embodiments of the present invention in detail.

Figure 1:
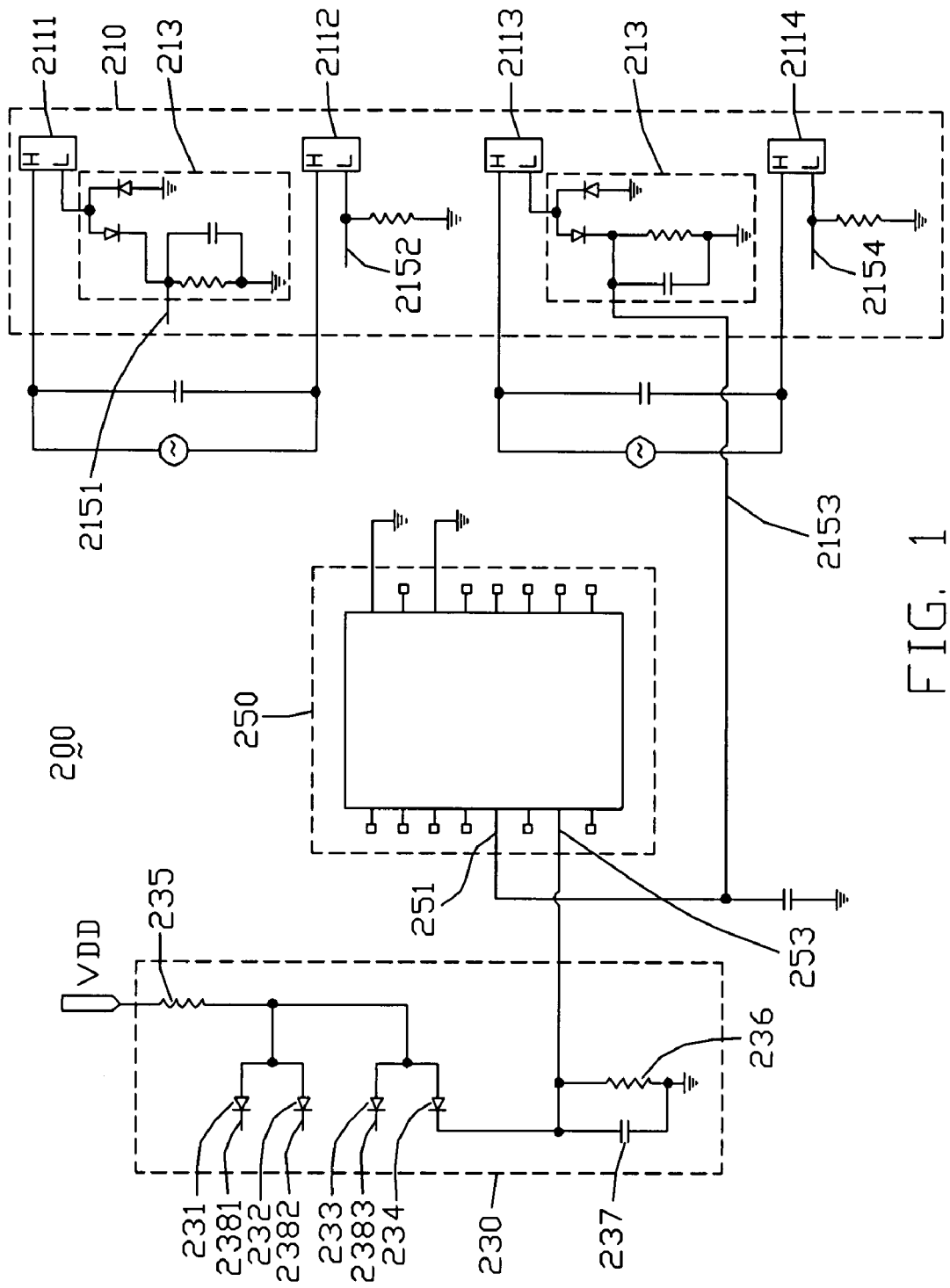
FIG. 1 is an abbreviated diagram of a backlight control circuit according to a first embodiment of the present invention, the backlight control circuit typically being used in an LCD.

FIG. 1 is an abbreviated diagram of a backlight control circuit according to a first embodiment of the present invention, the backlight control circuit typically being used in an LCD. The backlight control circuit 200 includes a load circuit 210, an input circuit 230, and a PWM IC 250.

The load circuit 210 includes a first lamp 2111, a second lamp 2112, a third lamp 2113, a fourth lamp 2114, a first output terminal 2151, a second output terminal 2152, a third output terminal 2153, a fourth output terminal 2154, and two rectifier and filter circuits 213. High voltage terminals of the first lamp 2111 and the second lamp 2112 are connected to an AC power supply (not labeled), and high voltage terminals of the third lamp 2113 and the fourth lamp 2114 are connected to another AC power supply (not labeled). The two AC power supplies output signals with the same phase. A low voltage terminal of the first lamp 2111 is connected to the first output terminal 2151 via a first one of the rectifier and filter circuits 213, and a low voltage terminal of the second lamp 2112 is directly connected to the second output terminal 2152. A low voltage terminal of the third lamp 2113 is connected to the third output terminal 2153 via a second one of the rectifier and filter circuits 213, and a low voltage terminal of the fourth lamp 2114 is directly connected to the fourth output terminal 2154.

The input circuit 230 includes a first switch diode 231, a second switch diode 232, a third switch diode 233, a voltage dividing diode 234, a current limiting resistor 235, a bias resistor 236, a filter capacitor 237, a first input terminal 2381, a second input terminal 2382, and a third input terminal 2383. Anodes of the first switch diode 231, the second switch diode 232, the third switch diode 233, and the voltage dividing diode 234 are connected to a DC power supply VDD via the current limiting resistor 235, respectively. Cathodes of the first switch diode 231, the second switch diode 232, and the third switch diode 233 are regarded as the first input terminal 2381, the second input terminal 2382, and the third input terminal 2383, respectively. The first, second, and third input terminals 2381, 2382, and 2383 are connected to the first, second, and fourth output terminals 2151, 2152, and 2154 of the load circuit 210, respectively. A cathode of the voltage dividing diode 234 is grounded via the bias resistor 236 and via the filter capacitor 237, respectively.

The PWM IC 250 includes a current sampling pin 251 and an overvoltage protection pin 253. The current sampling pin 251 can be connected to any of the output terminals, for example, the third output terminal 2153. The current sampling pin 251 is grounded via a capacitor (not labeled) to stabilize its input signal. The overvoltage protection pin 253 is connected to the cathode of the voltage dividing diode 234. The PWM IC 250 stops working if the current sampling pin 251 or the overvoltage protection pin 253 has a low voltage.

The first, second, third, and fourth lamps 2111, 2112, 2113, and 2114 may be cold cathode fluorescent lamps. The first, second, and third switch diodes 231, 232, and 233 may be BAW56/SOT type diodes, and the voltage dividing diode 234 may be a BAW56/SOT type diode too. A resistance of the current limiting resistor 235 is preferably 100 KΩ(kiloohms), and a resistance of the bias resistor 236 is preferably 510 KΩ. A capacitance of the filter capacitor 237 is preferably 0.1 μF (microfarads). The PWM IC 250 may be an OZ9910G type PWM IC.

Generally, operation of the backlight control circuit 200 is as follows. When the first, second, third, and fourth lamps 2111, 2112, 2113, and 2114 of the load circuit 210 work: the first output terminal 2151 provides a positive voltage to the first input terminal 2381 of the input circuit 230 and the first switch diode 231 turns off; the third output terminal 2153 provides a positive voltage to the current sampling pin 251 of the PWM IC 250; and the second output terminal 2152 and the fourth output terminal 2154 provide AC signals with the same phase to the second input terminal 2382 and the third input terminal 2383, respectively.

When the AC signals are in a positive phase, the second switch diode 232 and the third switch diode 233 are switched to an off state. Therefore the DC power supply VDD charges the filter capacitor 237, and the overvoltage protection pin 253 of the PWM IC 250 is maintained at a high voltage state. When the AC signals are in a negative phase, the second switch diode 232 and the third switch diode 233 are switched to an on state. Therefore the DC power supply VDD is grounded, and the filter capacitor 237 is discharged. However, the filter capacitor 237 is maintained at a positive voltage state during the period when the AC signals are in the negative phase, and the overvoltage protection pin 253 of the PWM IC 250 is maintained at the high voltage state, and thus the PWM IC 250 works normally.

When any one of the lamps 2111, 2112, 2113, or 2114 of the load circuit 210 has an open circuit or a short circuit, the corresponding output terminal 2151, 2152, 2153, 2154 outputs a low voltage. For example, when the first lamp 2111 has an open circuit or a short circuit, the first output terminal 2151 provides a low voltage to the first input terminal 2381. The first switch diode 231 is switched to an active state, and the DC power supply VDD is grounded. Therefore, the overvoltage protection pin 253 of the PWM IC 250 turns to a low voltage state, and the PWM IC 250 is switched to a protection state to protect the whole backlight control circuit 200.

When the second lamp 2112 or the fourth lamp 2114 has an open circuit or a short circuit, the backlight control circuit 200 undergoes operation similar to that described above in relation to an open or short circuit of the first lamp 2111. When the third lamp 2113 has an open circuit or a short circuit, the third output terminal 2153 provides a low voltage to the current sampling pin 251 of the PWM IC 250. Consequently, the PWM IC 250 stops working to protect the whole backlight control circuit 200.

The backlight control circuit 200 installs the diodes 231, 232, 233, and 234 to achieve switching functions. The diodes 231, 232, 233, 234 in effect replace the transistors 1331, 1332, 1333, 1334, 1335 of the above-described conventional backlight control circuit 100. Further, the load circuit 210 has only two rectifier and filter circuits 213. Therefore the structure of the backlight control circuit 200 is simple and inexpensive.

Figure 2:
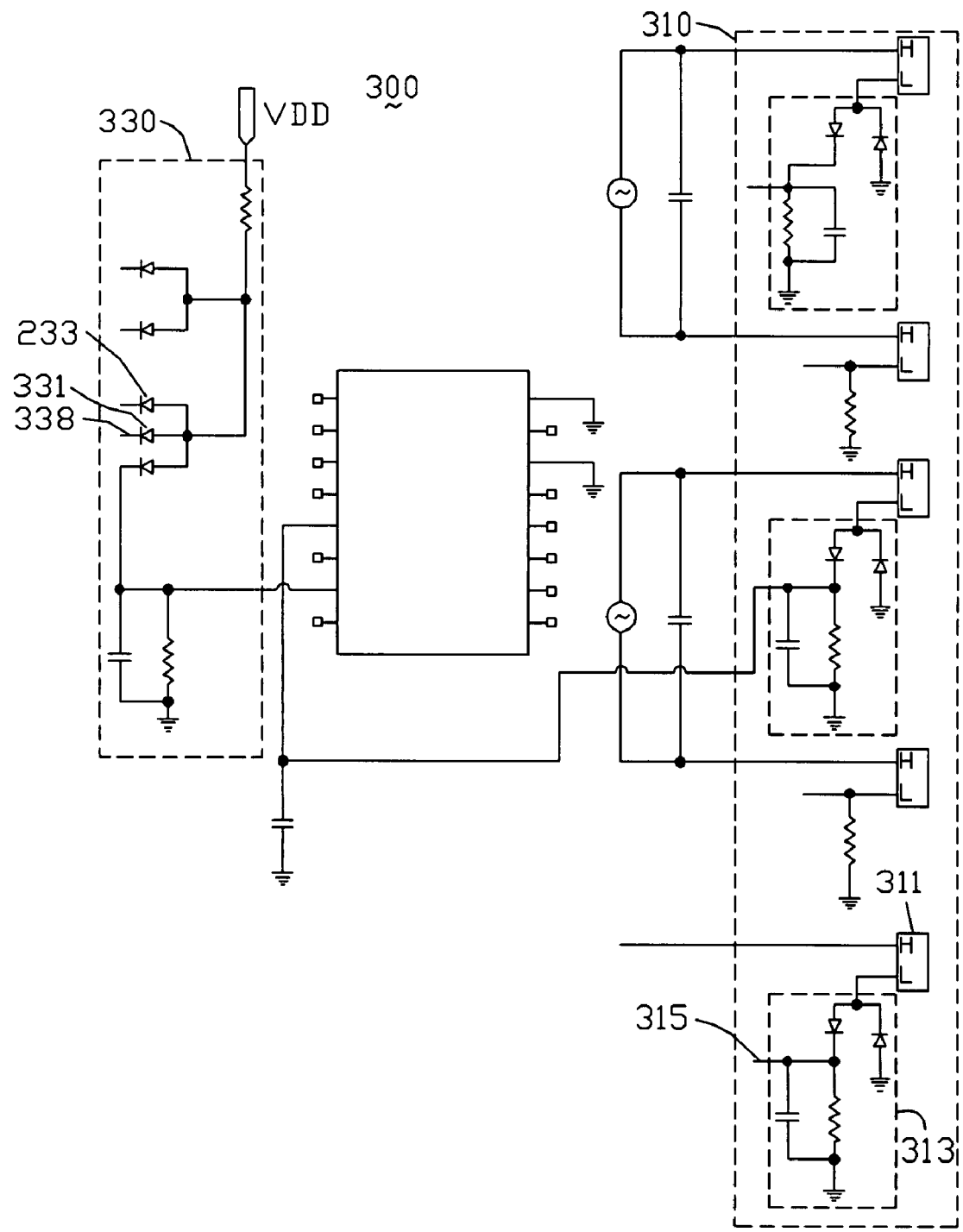
FIG. 2 is an abbreviated diagram of a backlight control circuit according to a second embodiment of the present invention, the backlight control circuit typically being used in an LCD.
Figure 3:
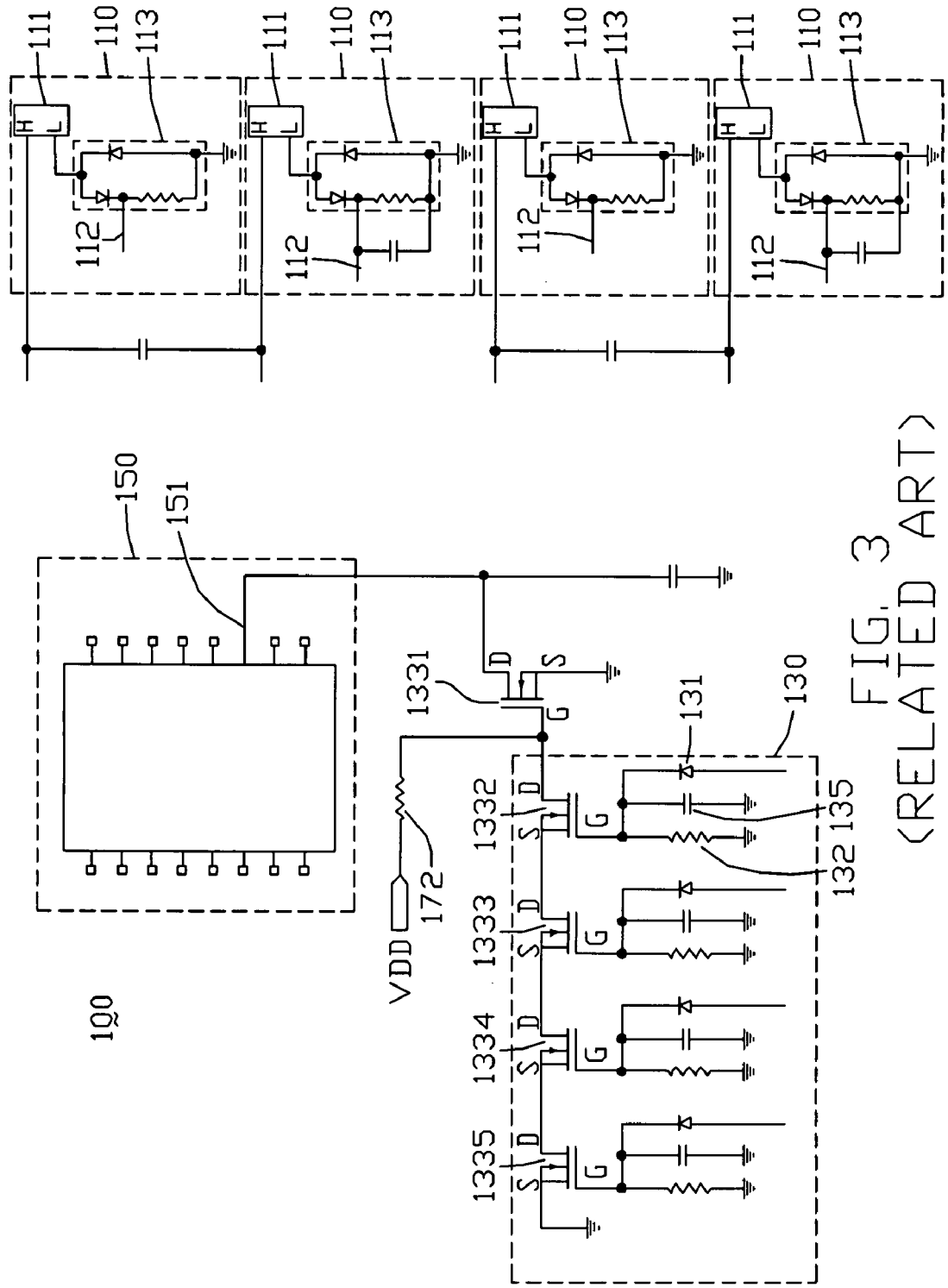
FIG. 3 is an abbreviated diagram of a conventional backlight control circuit used in an LCD.

FIG. 2 is an abbreviated diagram of a backlight control circuit according to a second embodiment of the present invention, the backlight control circuit typically being used in an LCD. The backlight control circuit 300 has a structure similar to that of the backlight control circuit 200. However, a load circuit 310 includes a fifth lamp 311, a third rectifier and filter circuit 313, and a fifth output terminal 315. The input circuit 330 includes a fourth switch diode 331 and a fourth input terminal 338. A low voltage terminal of the fifth lamp 311 is connected to the fifth output terminal 315 via the third rectifier and filter circuit 313. An anode of the fourth switch diode 331 is connected to the anode of the third switch diode 233, and a cathode of the fourth switch diode 331 is regarded as the fourth input terminal 338 of the input circuit 330. The fourth input terminal 338 receives signals from the fifth output terminal 315.

According to the first and second embodiments of the backlight control circuits 200 and 300, it can be deduced that: when a number N of the lamps is an odd number, a number of the rectifier and filter circuits is (N+1)/2; and when the number N of lamps is an even number, the number of rectifier and filter circuits is N/2. Therefore the present embodiments have relatively few rectifier and filter circuits, and simple structures. Including because of the above-mentioned advantages, the backlight control circuits 200 and 300 have advantages of low cost, less space being required on a printed circuit board, relatively easy wiring, and relatively easy debugging.

It is to be understood, however, that even though numerous characteristics and advantages of preferred and exemplary embodiments have been set out in the foregoing description, together with details of the structures and functions of the embodiments, the disclosure is illustrative only; and that changes may be made in detail, especially in matters of shape, size, and arrangement of parts within the principles of the invention to the full extent indicated by the broad general meaning of the terms in which the appended claims are expressed.

What is claimed is:

1. A backlight control circuit, comprising:
a direct current (DC) power supply;
a pulse width modulation integrated circuit (PWM IC) comprising a current sampling pin and an overvoltage protection pin, the PWM IC configured to stop working if any one of the current sampling pin and the overvoltage protection pin has a low voltage;
a load circuit comprising a first light source, a second light source, and a rectifier and filter circuit, a low voltage terminal of the first light source being connected to the current sampling pin of the PWM IC via the rectifier and filter circuit, and a low voltage terminal of the second light source being connected to the overvoltage protection pin of the PWM IC via an input circuit, and configured to output a feedback signal corresponding to a working status of the second light source;
wherein the input circuit comprises a switch diode and a voltage dividing diode, a cathode of the switch diode is configured to receive the feedback signal from the load circuit, and an anode of the switch diode is connected to the overvoltage protection pin of the PWM IC via the voltage dividing diode, when the feedback signal indicates a failure of the second light source, the switch diode is switched on and the voltage dividing diode is switched off such that a low voltage is applied to the overvoltage protection pin of the PWM IC and controls the PWM IC to stop working.

2. The backlight control circuit as claimed in claim 1, wherein the input circuit further comprises a capacitor and a plurality of diodes, and anodes of the plurality of diodes are connected to the DC power supply and are grounded via the switch diode and the capacitor.

3. The backlight control circuit as claimed in claim 2, wherein the load circuit further comprises a plurality of light sources in addition to the first and second light sources, at least another rectifier and filter circuit, and a plurality of diodes, a low voltage terminal of a first one of said plurality of light sources being connected to a cathode of a first one of said plurality of diodes of the input circuit via one of said at least another rectifier and filter circuit, a low voltage terminal of a second one of said plurality of light sources being connected to a cathode of a second one of said plurality of diodes of the input circuit.

4. The backlight control circuit as claimed in claim 3, wherein the total number of the two light sources plus said plurality of light sources is an odd number.

5. The backlight control circuit as claimed in claim 4, wherein the total number of the rectifier and filter circuit plus said at least another rectifier and filter circuit is half of the sum of the total number of all the light sources plus one.

6. The backlight control circuit as claimed in claim 3, wherein the total number of the two light sources plus said plurality of light sources is an even number.

7. The backlight control circuit as claimed in claim 6, wherein the total number of the rectifier and filter circuit plus said at least another rectifier and filter circuit is half of the total number of all the light sources.

8. The backlight control circuit as claimed in claim 6, wherein the total number of the two light sources plus said plurality of light sources is four.

9. The backlight control circuit as claimed in claim 1, wherein the input circuit further comprises a capacitor and a bias resistor, an anode of the voltage dividing diode is connected to the DC power supply and a cathode of the voltage dividing diode is grounded via the capacitor, and the bias resistor is connected in parallel with the capacitor.

10. The backlight control circuit as claimed in claim 9, wherein a resistance of the bias resistor is approximately 510 KΩ.

11. The backlight control circuit as claimed in claim 9, wherein the input circuit further comprises a current limiting resistor, and the current limiting resistor is connected between the DC power supply and the voltage dividing diode.

12. The backlight control circuit as claimed in claim 11, wherein a resistance of the current limiting resistor is approximately 100 KΩ.

13. The backlight control circuit as claimed in claim 3, further comprising another capacitor, wherein the current sampling pin of the PWM IC is grounded via said another capacitor.

14. The backlight control circuit as claimed in claim 3, wherein the PWM IC is an OZ9910G type PWM IC.

15. The backlight control circuit as claimed in claim 3, wherein a capacitance of the capacitor is approximately 0.1 μF.

16. The backlight control circuit as claimed in claim 3, wherein the first and second light sources and said plurality of light sources are lamps.

17. A backlight control circuit, comprising:
a first light source;
a control chip comprising a protection pin; and
an input circuit electrically between the protection pin of the control chip and the first light sources, the input circuit comprising a switch diode and a voltage dividing diode, a first terminal of the switch diode being configured to receive a feedback signal from the first light source, and a second terminal of the switch diode being electrically coupled to the protection pin of the control chip via the voltage dividing diode;

wherein the switch diode is switched on and the voltage dividing diode is switched off when the feedback signal indicates a failure of at least one of the first light sources, so as to provide a protection signal to the protection pin to control the control chip to stop working.

18. The backlight control circuit as claimed in claim 17, further comprising a second light source, wherein the control chip further comprises a sampling pin electrically coupled to the second light source for sampling a working voltage of the second light source, the control chip stops working when the sampling pin has a low voltage.

19. The backlight control circuit as claimed in claim 18, further comprising a rectifier and filter circuit, wherein high voltage terminals of the first light source and the second light source are connected to an AC power supply, a low voltage terminal of the first light source is connected to a cathode of the switch diode, an anode of the switch diode is connected to an anode of the voltage dividing diode, a cathode of the voltage dividing diode is connected to the protection pin of the control chip, and a low voltage terminal of the second light source is connected the sampling pin of the control chip via the rectifier and filter circuit.

20. The backlight control circuit as claimed in claim 19, wherein the anodes of the switch diode and the voltage dividing diode are connected to a DC power supply, each of the protection pin and the sampling pin of the control chip is grounded via a capacitor.

* * * * *